United States Patent
Wigren et al.

(10) Patent No.: US 9,247,517 B2
(45) Date of Patent: Jan. 26, 2016

(54) POSITIONING WITH SPLIT ANTENNAS PER CELL

(75) Inventors: Torbjörn Wigren, Uppsala (SE); Michael Anderson, Alpharetta, GA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 897 days.

(21) Appl. No.: 13/430,072

(22) Filed: Mar. 26, 2012

(65) Prior Publication Data

US 2013/0252629 A1    Sep. 26, 2013

(51) Int. Cl.
H04W 24/00 (2009.01)
H04W 64/00 (2009.01)
G01S 5/02 (2010.01)

(52) U.S. Cl.
CPC ............ *H04W 64/00* (2013.01); *G01S 5/0236* (2013.01)

(58) Field of Classification Search
CPC ... H04W 24/00; H04W 52/241; H04W 16/00; H04W 52/265; H04W 72/04; H04W 72/0453; H04W 16/10; H04W 56/00; H04W 72/042; H04W 72/0466; H04W 88/02; H04W 88/085; H01Q 1/246; H01Q 25/00; H01Q 21/24
USPC ...................................................... 455/456.1
See application file for complete search history.

(56) References Cited

U.S. PATENT DOCUMENTS

| | | | |
|---|---|---|---|
| 2004/0203921 A1* | 10/2004 | Bromhead et al. | 455/456.1 |
| 2009/0017831 A1 | 1/2009 | Wigren | |
| 2010/0062790 A1 | 3/2010 | Wigren | |
| 2011/0250905 A1 | 10/2011 | Wigren | |
| 2012/0040693 A1 | 2/2012 | Wigren et al. | |
| 2012/0052875 A1* | 3/2012 | Kangas et al. | 455/456.1 |

FOREIGN PATENT DOCUMENTS

| | | |
|---|---|---|
| EP | 1 094 335 A1 | 4/2001 |
| EP | 1 448 008 A1 | 8/2004 |
| WO | 2010/069613 A1 | 6/2010 |
| WO | 2010/123418 A1 | 10/2010 |
| WO | 2010/144765 A1 | 12/2010 |
| WO | 2011/139201 A1 | 11/2011 |

OTHER PUBLICATIONS

International Search Report and Written Opinion w/cover sheet dated Dec. 17, 2013 in corresponding International Application No. PCT/SE2013/050294 (13 pages total).

(Continued)

*Primary Examiner* — Kwasi Karikari
(74) *Attorney, Agent, or Firm* — Patent Portfolio Builders, PLLC

(57) ABSTRACT

In a split antenna system, a radio network node determines an association between a target wireless terminal and an antenna being used to communicate with the target wireless terminal. The radio network node provides an association information and a signal information of properties of a wireless signal used for communication between the antenna to a positioning node. The association information can include the identity of the antenna, which can be encoded in least significant bits of a position measurement included in the signal information. The positioning node determines a position of the target wireless terminal based on the association information and the signal information.

18 Claims, 8 Drawing Sheets

(56) References Cited

OTHER PUBLICATIONS

Torbjörn Wigren et al., "Adaptive Enhanced Cell-ID Fingerprinting Localization by Clustering of Precise Position Measurements", IEEE Transactions on Vehicular Technology, vol. 56, No. 5, Sep. 2007, pp. 3199-3209.

Jenni Wennervirta et al., "RTT Positioning Field Performance", IEEE Transactions on Vehicular Technology, vol. 59, No. 7, Sep. 2010, (5 pages).

* cited by examiner

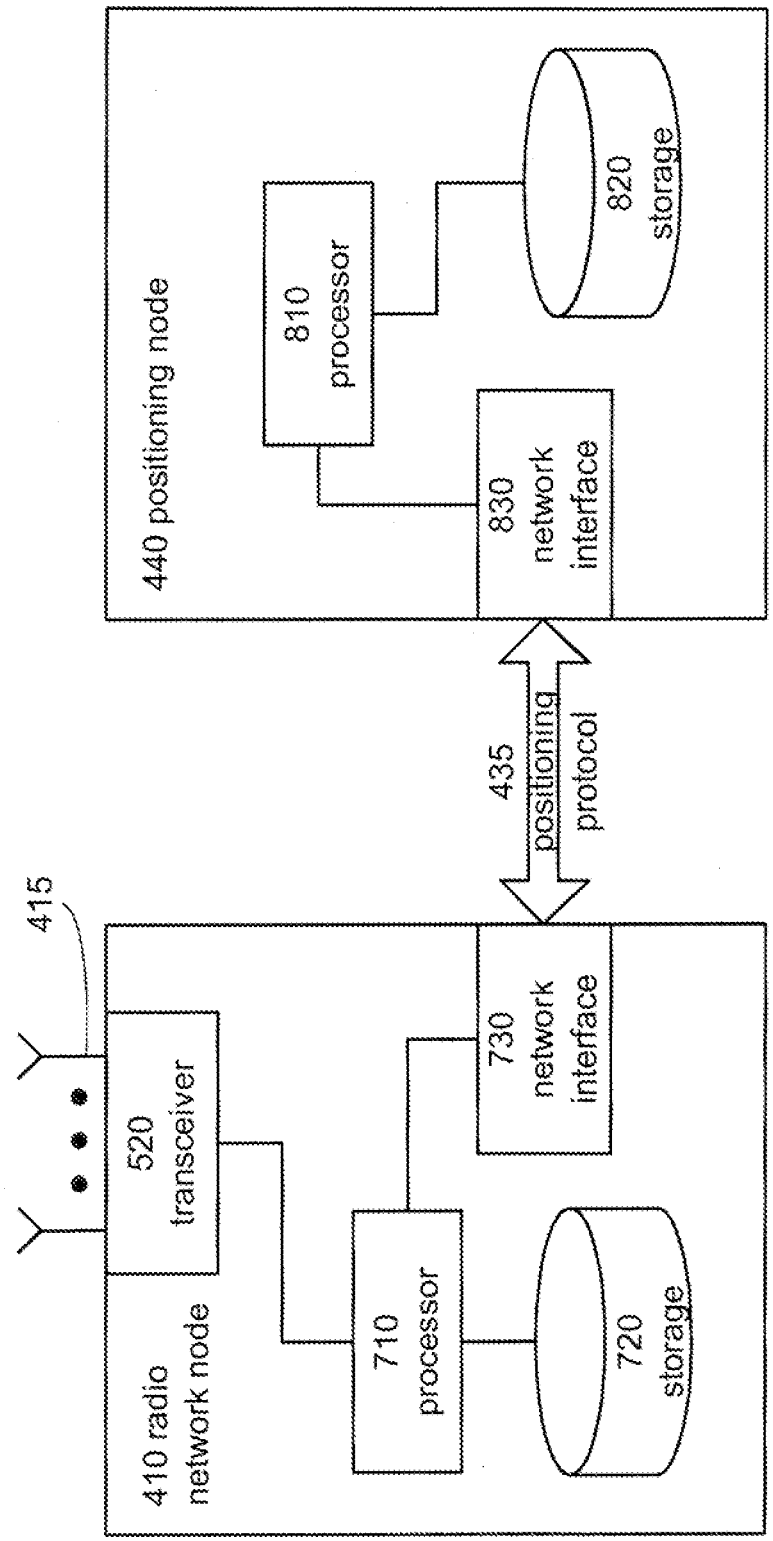

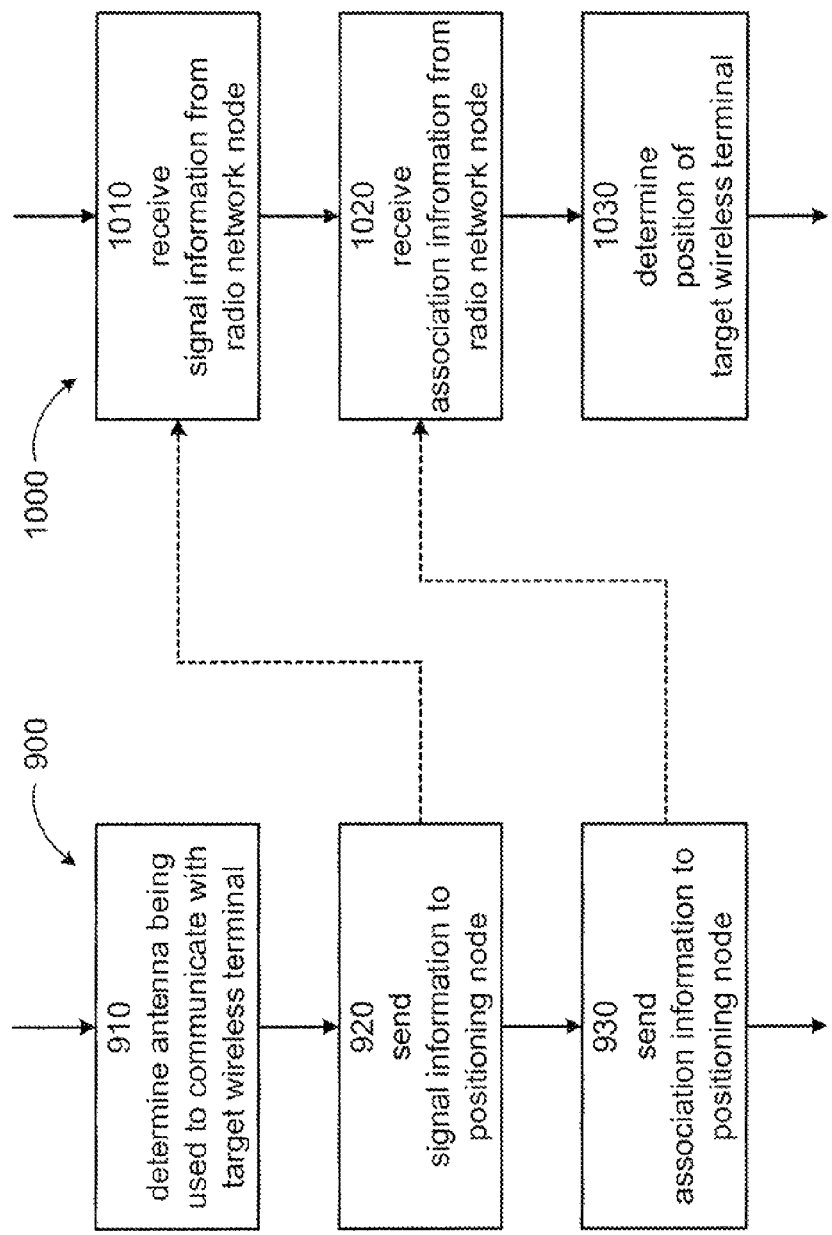

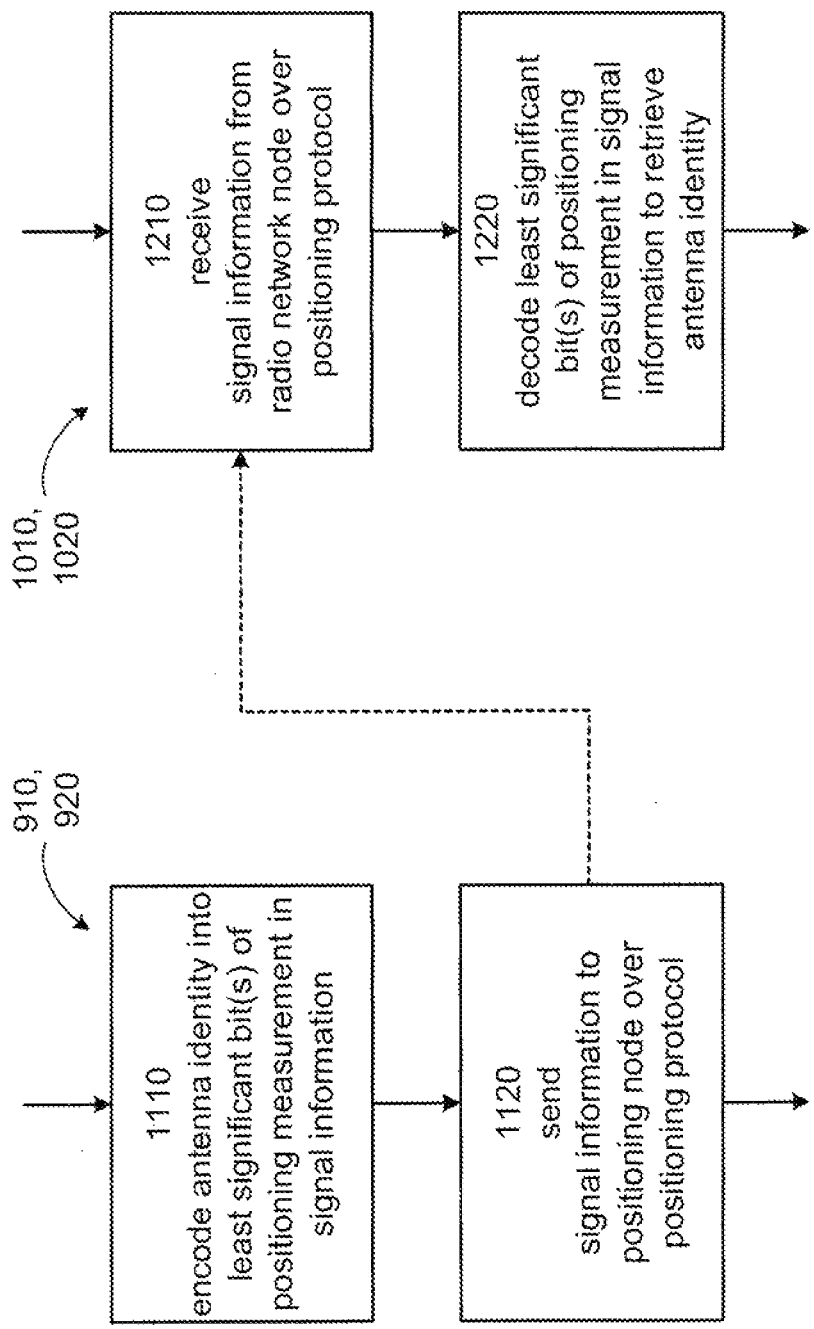

POSITIONING WITH SPLIT ANTENNAS PER CELL

TECHNICAL FIELD

The technical field of the present disclosure generally relates to positioning of mobile terminals in cellular system. In particular, the technical field relates to apparatus(es), method(s), and/or system(s) for determining positions of mobile terminals in cells with split antennas.

BACKGROUND

The possibility to determine the position of a mobile terminal such as a user equipment (UE) has enabled application developers and wireless network operators to provide location based, and location aware, services. Examples of those are guiding systems, shopping assistance, friend finder, presence services, community and communication services and other information services giving the mobile user information about their surroundings.

In addition to the commercial services, the governments in several countries have put requirements on the network operators to be able to determine the position of an emergency caller. For instance, the governmental requirements in the USA (FCC E-911) mandates that it must be possible to determine the position of a certain percentage of all emergency calls, with high accuracy and within a pre-specified maximum time. Terrestrial positioning methods are necessary for use as a backup when celestial positioning methods (e.g., GPS, Galileo) are not available or the UE is not capable of celestial positioning methods.

As will be described in further detail below, use of split antennas can impair the terrestrial positioning methods such that the terrestrial positioning are not sufficiently accurate. This in turn can lead to disadvantages both commercially and in being able to meet government requirements for an operator.

SUMMARY

A non-limiting aspect of the disclosed subject matter is directed to a method performed in a radio network node of a wireless network for determining a position of a target wireless terminal. The method comprises the steps of determining that a first antenna of the cell is being used to wirelessly communicate with the target wireless terminal, sending a signal information to a positioning node, and sending an association information to the positioning node. The signal information comprises one or more properties of a wireless signal used for the wireless communication between the first antenna and the target wireless terminal, and the association information comprises information associating the first antenna with the target wireless terminal. The radio network node provides wireless communication services in the cell through a plurality of antennas. The plurality of antennas includes the first and second antennas whose radio coverages are decoupled from each other.

Another non-limiting aspect of the disclosed subject matter is directed to a radio network node of a wireless network. The radio network node is structured to determine a position of a target wireless terminal in a cell. The radio network node comprises a plurality of antennas structured to provide wireless communication services in the cell. The plurality of antennas includes first and second antennas whose radio coverages are decoupled from each other. The radio network node also includes an association determiner and a network communicator. The association determiner is structured to determine that the first antenna is being used to wirelessly communicate with the target wireless terminal. The network communicator is structured to send a signal information and an association signal to the positioning node. The signal information comprises one or more properties of a wireless signal used for the wireless communication between the first antenna and the target wireless terminal, and the association information comprises information associating the first antenna with the target wireless terminal.

Yet another non-limiting aspect of the disclosed subject matter is directed to a non-transitory computer-readable medium which has stored therein programming instructions. When a computer executes the programming instructions, the computer executes the method performed in a radio network node of a wireless network as described above for determining a position of a target wireless terminal.

Yet another non-limiting aspect of the disclosed subject matter is directed to a method performed in a positioning node for determining a position of a target wireless terminal in a cell of a wireless network. The method comprises receiving a signal information from a radio network node of the wireless network, receiving an association information from the radio network node, and determining the position of the target wireless terminal based on the signal information and the association information. The signal information comprises one or more properties of a wireless signal used for the wireless communication between the first antenna and the target wireless terminal, and the association information comprises information associating the first antenna with the target wireless terminal. The radio network node provides wireless communication services in the cell through a plurality of antennas. The plurality of antennas includes the first and second antennas whose radio coverages are decoupled from each other.

Yet another non-limiting aspect of the disclosed subject matter is directed to a positioning node structured to determine a position of a target wireless terminal in a cell of a wireless network. The positioning node comprises a network communicator and a position determiner. The network communicator is structured to receive a signal information from a radio network node of the wireless network, and receive an association information from the radio network node. The signal information comprises one or more properties of a wireless signal used for the wireless communication between a first antenna and the target wireless terminal, and the association information comprises information associating the first antenna with the target wireless terminal. The position determiner is structured to determine the position of the target wireless terminal based on the signal information and the association information. The radio network node provides wireless communication services in the cell through a plurality of antennas. The plurality of antennas includes the first and second antennas whose radio coverages are decoupled from each other.

Yet another non-limiting aspect of the disclosed subject matter is directed to a non-transitory computer-readable medium which has stored therein programming instructions. When a computer executes the programming instructions, the computer executes the method performed in a positioning node as described above for determining a position of a target wireless terminal.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIGS. 7 and 8 respectively illustrate other example embodiments of a radio network node and a positioning node;

FIGS. 9 and 10 illustrate flow charts of example methods performed respectively by a radio network node and a positioning node to determine a position of a target wireless terminal;

FIGS. 11 and 12 illustrate flow charts of example processes performed respectively by a radio network node and a positioning node to exchange signal and association information over a positioning protocol.

DETAILED DESCRIPTION

Figure 2:
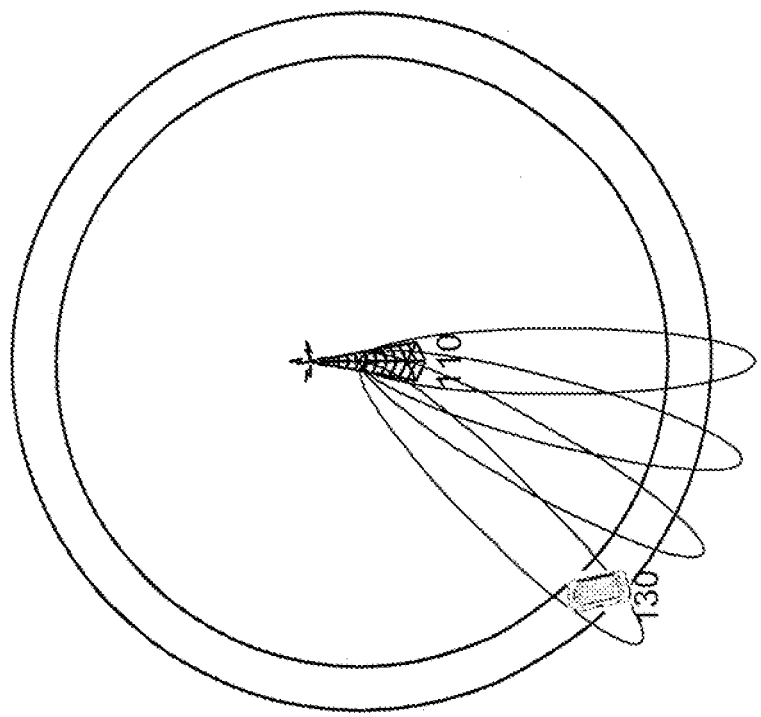
FIG. 2 illustrates an example of an angle-of-arrival measurement.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, LTE—are used as examples for explanation purposes. Note that the technology described herein can be applied to non-3GPP standards, e.g., WiMAX, cdma2000, 1xEVDO, etc. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a radio network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

Figure 1:
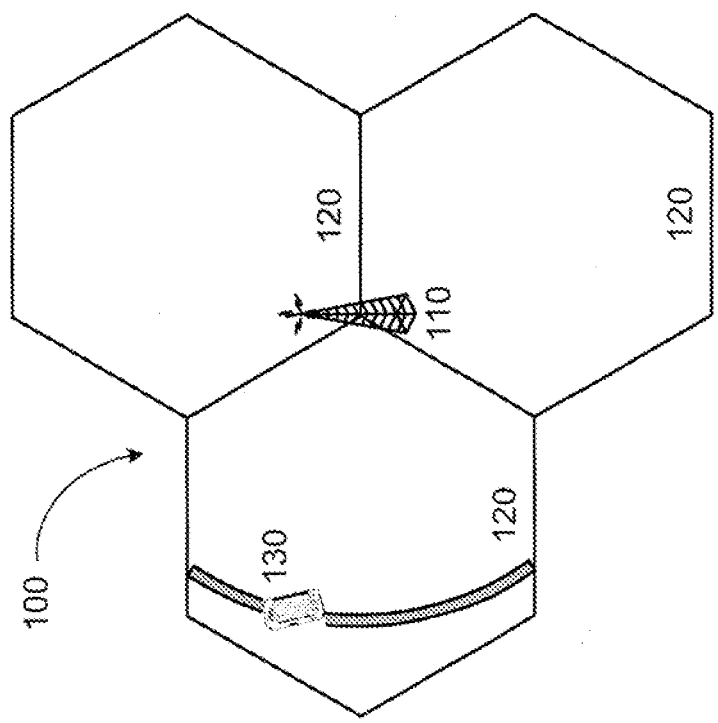
FIG. 1 illustrates an example scenario in which a terrestrial positioning method can be used to determine a location of a wireless terminal.

As indicated above, terrestrial positioning capability can be very important to wireless network operators not only due to government regulations, but also due to competitive market pressures. FIG. 1 illustrates an example scenario in which a terrestrial positioning method can be used to determine a location of a wireless terminal. In FIG. 1, a wireless network 100 comprises a radio network node 110 and a wireless terminal 130 located in one of the cells 120 served by the radio network node 110. Examples of the wireless terminal 130 include UEs, cell phones, tablets, laptops, a dongle in a PC, and so on. Examples of the radio network node 110 include radio base station (RBS), Node-B, eNodeB, and so on.

Only one radio network node 110 and only one wireless terminal 130 are shown in FIG. 1 for simplicity of explanation. However, it should be noted that the concepts described herein can be translated to a network with multiple radio network nodes and multiple wireless terminals. Also three cells 120 are shown to be served by the radio network node 110 in FIG. 1. Again, this is merely an example. A radio network node 110 may serve any number of cells.

A cell in the context of this disclosure refers to a particular geographical region served by a radio network node, and each cell is distinguished from another cell. For example, each cell 120 may be identified by a cell identity (ID) that is different from cell IDs of other cells. The cell ID can be universally unique, or can be unique at least among cells in a geographical region.

In FIG. 1, it is assumed that the knowledge of the geographical extension of the cell 120 (e.g., the cell ID) of the wireless terminal 130 and a measurement of a range between the wireless terminal 130 and the radio network node 110 are combined to determine the position of the wireless terminal 130. It is also assumed that the receiver and the antennas of the radio network node 110 are co-located. The range measurement can be obtained through, among others:

RSS (received signal strength);
Path loss;
TA (timing advance); and
RTT (round trip time).

The power measurements can use a path loss model that is dependent on the range in order to solve for the range, given measurements of the RSS or path loss. This can be expressed by the equation:

$$r = f(L) \quad (1)$$

where L is a path loss determined from a path loss measurement, that may in turn be based on an RSS measurement. The main problem with this approach is that fading renders these measurements inaccurate. It is not unusual to have inaccuracies of about 50% of the measured distance. The bad performance typically scales with the size of the cell. These techniques are therefore more suitable for urban positioning.

The time based range measurements have better accuracies unless the cells are very small. These solutions include methods that are based on TA or RTT measurements. The TA measurement principle is depicted in FIG. 1. Briefly, the travel time of radio waves from the eNodeB (notation for the RBS in LTE (Long Term Evolution) to the UE and back is measured. The distance from eNodeB to UE then follows from the equation:

$$r = c \frac{TA}{2} \quad (2)$$

where TA is the timing advance and where c is the speed of light. The TA alone defines a circle, or if the inaccuracy is accounted for, a circular strip around the eNodeB. By combining this information with the cell polygon (identified by the cell ID), left and right angles of the circular strip can be computed.

In LTE, AoA (angle of arrival) measurement of a signal from the UE is defined as the estimated angle of the UE with respect to a reference direction which is typically the geographical north, and is positive in a clockwise direction. If combined with TA, the AoA can reduce the angular uncertainty as compared to cell ID and TA positioning alone. This is illustrated in FIG. 2.

Another approach is provided by so called fingerprinting positioning. Fingerprinting positioning algorithms operate by creating a radio fingerprint for each point of a fine coordinate grid that covers the Radio Access Network (RAN). The fingerprint may include:
  The cell IDs that are detected by the UE in each grid point;
  Quantized path loss or RSS measurements, with respect to multiple eNodeBs/NodeBs, performed by the UE, in each grid point (an associated ID of the eNodeB/NodeB may also be included);
  Quantized TA or RTT, in each grid point (an associated ID of the eNodeB/NodeB may also be included); and
  Quantized AoA information.

Whenever a position request arrives, a radio fingerprint is first measured, after which the corresponding grid point is looked up and reported. This of course indicates that the point is should be unique.

The database of fingerprinted position can be generated in several ways. A first alternative would be to perform an extensive surveying operation that performs fingerprinting radio measurements repeatedly for all coordinate grid points of the RAN. Disadvantages to this approach include:
  The surveying required becomes substantial even for small cellular networks; and
  The radio fingerprints are in some instances (e.g., signal strength and path loss) sensitive to the orientation of the terminal, which is particularly troublesome for handheld UEs. For fine grids, the accuracies of the fingerprinted positions therefore become highly uncertain. This is unfortunately seldom reflected in the accuracy of the reported geographical result.

A second alternative is referred to as AECID (adaptive enhanced cell identity) positioning. Details of this method are described in "Adaptive Enhanced Cell-ID Fingerprinting Localization by Clustering of Precise Position Measurements" (T. Wigren, *IEEE Transactions on Vehicular Technology*, Vol. 56, No. 5, 2007, pp. 3199-3209) herein incorporated by reference in its entirety. The AECID approach involves replacing the fine grid by high precision position measurements of opportunity, and providing the fingerprinting radio measurements for the points. This avoids the drawback of the surveying alternative. However,
  Algorithms for clustering of high precision position measurements of opportunity needs to be defined; and
  Algorithms for computation of geographical descriptions of the clusters need to be defined.
These issues are addressed in US patent publications 2010/0062790 A1 to Wigren and 2012/0040693 A1 to Wigren et al., both of which are herein incorporated by reference in their entirety.

The OTDOA (observed time difference of arrival) method is a terrestrial positioning method which relies on measurements on a pilot radio signal from multiple base stations. The measurement is performed by means of correlation with the known signals of the base stations measured upon. The situation is depicted in FIG. 3.

Figure 3:
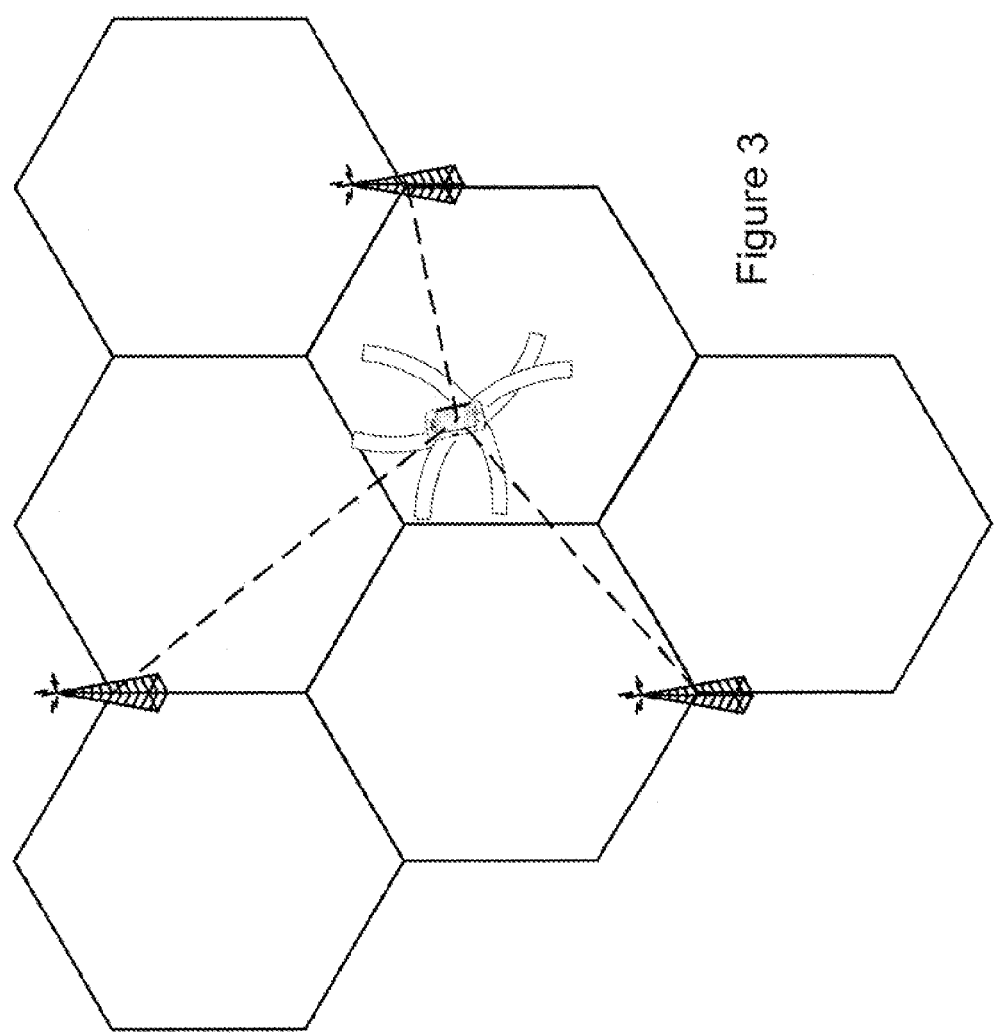
FIG. 3 illustrates an example scenario in which observed time different of arrival can be used to determine a location of a wireless terminal.

Assuming that the measurement are successful for a number of cells, three of which are depicted in FIG. 3, the relations between the measured TOAs at the UE, the transmission times from the base stations (eNodeBs) and the distances between the UEs and the base stations are can be expressed as follows:

$$t_{TOA,1} + b_{clock} = T_1 + \|r_1 - r_{Terminal}\|/c \quad (3)$$
$$\vdots$$
$$t_{TOA,n} + b_{clock} = T_n + \|r_n - r_{Terminal}\|/c.$$

Here $t_{TOA,i}$, i=1, ..., n denotes the measured time of arrivals (TOAs) at the UE, $T_i$, i=1, ..., n denotes the transmission times from the eNodeBs and c is the speed of light. The boldface quantities are the (vector) locations of the base stations and the UE, and $b_{clock}$ denotes the unknown clock bias of the UE with respect to the cellular system time. In TDOA positioning, time of arrival differences with respect to the own site are formed according to:

$$t_{TDOA,2} = t_{TOA,2} - t_{TOA,1} \quad (4)$$
$$= T_2 - T_1 + \|r_2 - r_{Terminal}\|/c - \|r_1 - r_{Terminal}\|/c$$
$$\vdots$$
$$t_{TDOA,n} = t_{TOA,n} - t_{TOA,1}$$
$$= T_n - T_1 + \|r_n - r_{Terminal}\|/c - \|r_1 - r_{Terminal}\|/c.$$

In these n−1 equations, the left hand sides are known (with some additional measurement error) provided that the time of transmission differences (denoted the real time differences) can be measured, and that the transmit antenna positions are known, and can be associated to a specific UE. The problem is that this is not the case when split antenna systems are used. Then many isolated areas of coverage with different foot point corresponds to the same scrambling code, i.e., the same cell.

When this problem is solved the remaining unknown is the terminal location, i.e., $$r_{Terminal} = (x_{Terminal} y_{Terminal} z_{Terminal})^T \quad (5)$$

More commonly, a two dimensioning positioning is performed instead.

$$r_{Terminal} = (x_{Terminal} y_{Terminal})^T \quad (6)$$

The uplink time difference of arrival method (U-TDOA) in WCDMA and LTE is the reverse of the OTDOA method in that the position of the receiver antennas of a split antenna system all need to be known and associated to a specific UE.

Figure 4:
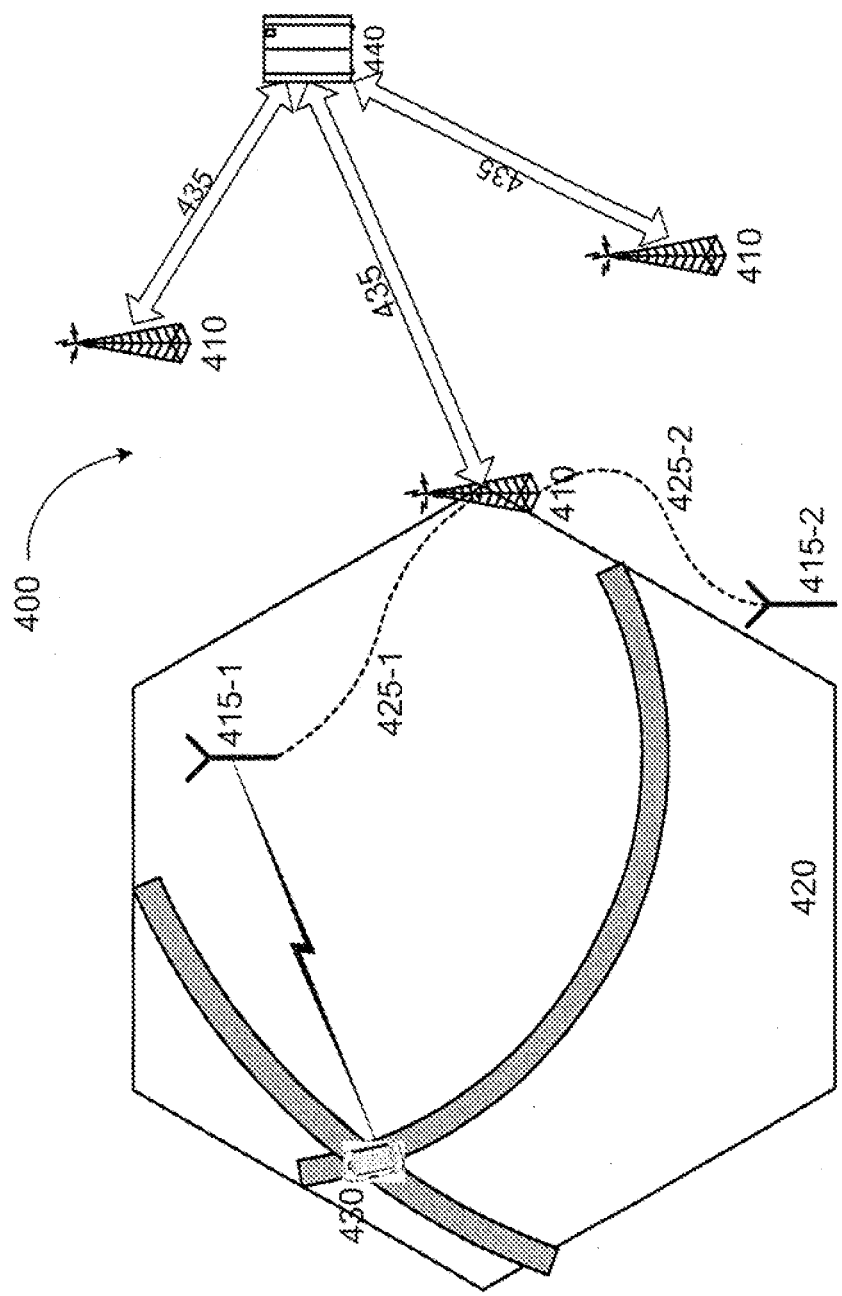
FIG. 4 illustrates an example scenario in which radio network nodes and positioning nodes cooperate to determine a position of a target wireless terminal.

In one aspect of the disclosed subject matter as illustrated in FIG. 4, one or more radio network nodes 410 of a wireless network 400 cooperate with a positioning node 440 to determine a position of a wireless terminal 430—a target wireless terminal 430—in a cell 420 served by one of the radio network nodes 410. For simplicity of explanation, only one cell of one radio network node is shown. However, it should be noted that each radio network node 410 can be associated with any number of cells. Again, it is assumed that each cell is identifiable, at least among the cells associated with the radio network nodes 410 represented in this figure. Communication between the radio network nodes 410 and the positioning node 440 can be performed over a positioning protocol 435, which will be further described in detail later.

In FIG. 4, it is assumed that the radio network node 410 includes a plurality of antennas 415 used to provide communication services to one or more wireless terminals, including the target wireless terminal 430, located in the cell 420. Among the plurality of antennas 415 are a first antenna 415-1 and a second antenna 415-2. While not shown, there can be antennas other than the first and second antennas 415-2, 415-2 used to provide communication services to wireless terminals in the same cell 420.

Unlike the scenario presented in FIG. 1, it is assumed in FIG. 4 that the antennas of the radio network node 410 are not coupled in a radio sense. That is, the radio coverage of at least one antenna serving the cell 420 is distinct from the radio coverage of at least one other antenna serving the same cell 420. In FIG. 4, it is assumed that the radio coverages of the first and second antennas 415-1, 415-2 are substantially decoupled from each other. As will be shown below, such decoupling can be due to differences in geographical locations of the antennas, barriers that isolate the coverage areas of the antennas, and antenna directions (horizontal and/or vertical) among others.

In FIG. 4, it is assumed that the radio coverage decoupling is due to differences in geographical locations, i.e., the first and second antennas 415-1, 415-2 are located in different geographical locations. For ease of reference, the locations these antennas will be respectively referred to as first and second geographical locations. Note that it is not strictly necessary that the antennas 415 themselves be located within the cell 420 as long as the antennas 415 can be used to provide services to the wireless terminals 430 located in the cell 420. For example, the second geographical location is not in the cell 420. Nonetheless, the second antenna 415-2 can still be used provide services for terminals in the cell 420.

There are multitudes of reasons for splitting the antennas serving a cell and distributing them. The split antenna technology has been used for many years in so called radio remote units, where antenna front end electronics are distributed with the antenna group. Note that in one or more aspects, it is possible to have split antennas for a cell in the downlink, the uplink, or both.

A first example where split antennas, and even pure relaying techniques, are used is to handle coverage holes in the network. In such cases an antenna or a group of antennas are dedicated to cover this hole that may appear in the downlink, uplink or both. Another more uniform example occurs when a single cell is used to cover more than one floor of a building. The radio isolation between the floors means that separate antennas or separate groups of antennas should be provided for each floor. The isolation between the floors makes the wireless terminals essentially associated only with the antenna group of each floor. Yet the terminals may belong to the same cell since the number of users on each floor may be too small to motivate dedicating a whole cell to each floor.

Still another example occurs at subway stations where it has become common to aim antennas in two directions along the station, separating the antennas by e.g., 180 degrees. In such situations the radio coupling between the antennas becomes very small, yet the two antennas may represent the same cell if the number of users does not justify a separate cell in every direction. Note that in this case the antennas may have the same foot-print, but the directions may differ.

There are scheduling problems associated with the conventional split antenna technology. In cases where a single antenna covers a region of a cell, there is no diversity gain, so 3 dB is lost on average, and in some situation, the loss is greater. In conventional uplink scheduling of WCDMA systems, the scheduling is performed on a per cell basis. The wireless terminals are scheduled so that the total uplink load in the cell is kept below certain thresholds such as a rise over thermal (RoT) threshold. Individual terminal's contribution to the RoT correlates to the transmission power of the terminal. In indoors, Raleigh fading may leave a terminal in a deep fading dip for a long time, which requires the wireless terminal to transmit with very high power in the uplink. This means that the RoT threshold headroom can be consumed by one badly fading wireless terminal connected to one antenna of the cell, which would prevent another terminal connected to another distinct antenna of the cell from being scheduled.

There are also positioning problems associated with the conventional split antenna technology. Conventionally, the wireless terminal is associated with the cell. However, in split antenna systems, the location of the cell (more specifically, the location of the radio network node 410 serving the cell) is not necessarily the same the as the locations of the antennas. This can make it difficult to accurately determine the location of the wireless terminal 430 based on measurements such as RTT, TA, and so on.

Figure 6:
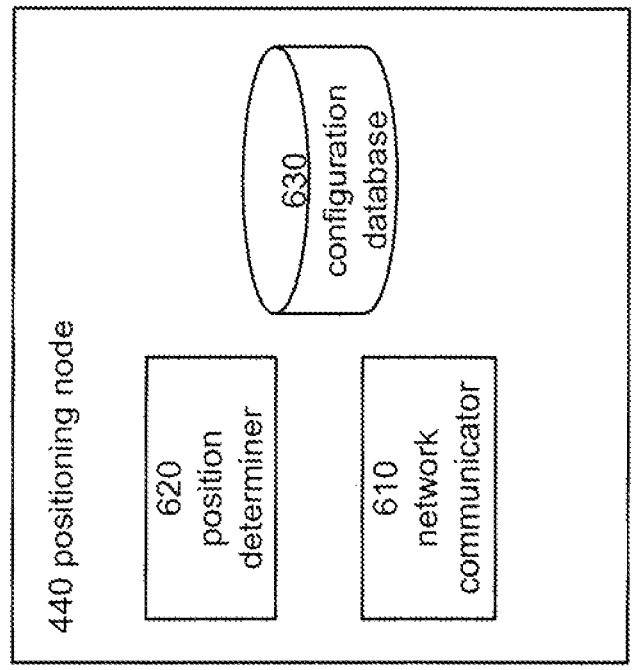
FIGS. 5 and 6 respectively illustrate example embodiments of a radio network node and a positioning node.
Figure 5:
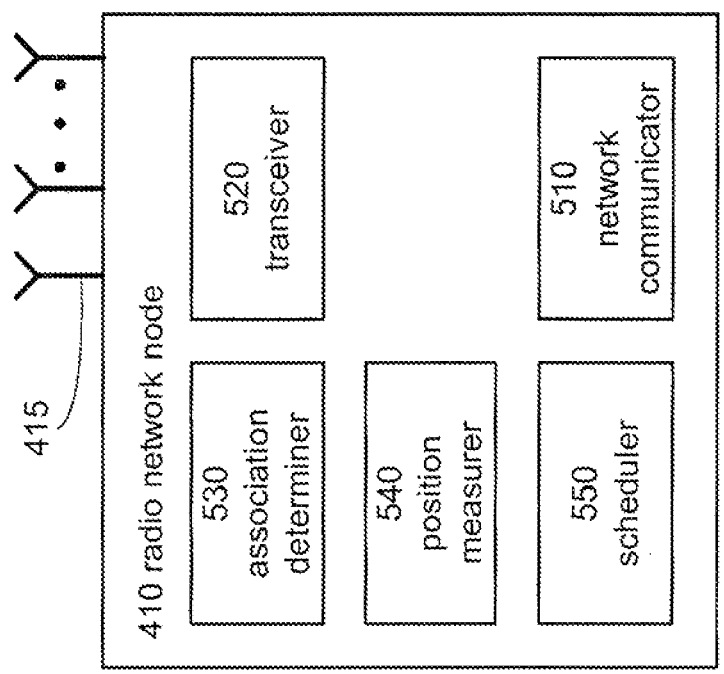

FIGS. 5 and 6 are example embodiments of a radio network node 410 (e.g., base station, eNB, Node-B, eNodeB, RBS, etc.) and a positioning node 440 (e.g., SMLC, eSMLC, SMPC, etc.) that address the above described issues and other problems related to the conventional split antenna systems. Briefly, the radio network node 410 and the positioning node 440 cooperate to determine an association between a target wireless terminal 430 and the antenna 415 communicating with the target wireless terminal 430, retrieve configuration characteristics of the antenna, and determine the position of the target wireless terminal 430 based on the antenna information and the configuration characteristics of the antenna.

The radio network node 410 may comprise a network communicator 510 structured to communicate with other network nodes and nodes of the core network including the positioning node 440, a plurality of antennas 415 including the first and second antennas 415-1, 415-2, a transceiver 520 structured to transmit and receive wireless signals to and from one or more wireless terminals including the target wireless terminal 430 over the plurality of antennas 415, an association determiner 530 structured to determine an association between a particular antenna 415 (e.g., the first antenna 415-1) being used to communicate with a wireless terminal (e.g., the target wireless terminal 430), a position measurer 540 structured to provide one or more position measurements, and a scheduler 550 structured schedule communications between the radio network node 410 and one or more wireless terminals 430.

The positioning node 440 may comprise a network communicator 610 structured to communicate with other network nodes including one or more radio network nodes 410 and a position determiner 620 structured to determine the position of the target wireless terminal 430 based on information received from the radio network node 410. The positioning node 440 may also include a configuration database 630 in which configuration information related to the antennas of the radio network node 410 are stored. Some specific functions performed by the radio network node 410 and the positioning node 440 will be described further below.

It should be noted that FIGS. 5 and 6 respectively provide logical views of the radio network node 410 and the positioning node and the devices included therein. It is not strictly necessary that each device be implemented as physically separate modules or circuits. Some or all devices may be combined in one physical module. Also, one or more devices may be implemented in multiple physical modules.

The devices of the radio network node 410 and/or the positioning node 440 need not be implemented strictly in hardware. It is envisioned that any of the devices can be implemented through a combination of hardware and software. For example, as illustrated in FIG. 7, the radio network node 410 may include one or more processors executing program instructions stored in a non-transitory storage medium or in firmware (e.g., ROM, RAM, Flash) (denoted as storage 720) to perform the functions of the radio network node devices. The radio network node 410 also includes a transceiver 520 structured to receive signals from one or more wireless terminals 430 and to send signals to the wireless terminals 430 one or more antennas. The transmitter and the receiver may be implemented as physically separate devices. The radio network node 410 may also include a network interface 730 to communicate with other network nodes including the position node 440.

Similarly, as illustrated in FIG. 7, the positioning node 440 may include one or more processors executing program instructions stored in a non-transitory storage medium or in firmware (e.g., ROM, RAM, Flash) (denoted as storage 820) to perform the functions of the positioning node devices. The positioning node 440 may include a network interface 830 to communicate with other network nodes including the radio network node 410. The configuration database may be implemented in the storage 820 or may be accessible to the position node 440 from a database server (not shown).

FIGS. 9 and 10 are flow charts of example methods performed by the radio network node 410 and the positioning node 440, respectively, to determine the position of the target wireless terminal 430 in the cell 420. Recall that in the scenario depicted in FIG. 4, it is assumed that the radio network node 410 comprises a plurality of antennas 415 used to provide communication services to one or more wireless terminals, including the target wireless terminal 430, located in the cell 420. Among the plurality of antennas 415 are a first antenna 415-1 and a second antenna 415-2 located in first and second geographical locations which are different from each other. Also in FIG. 4, it is assumed that the first antenna 415-1 is being used to wirelessly communicate with the target wireless terminal 430 as indicated by a radio link connecting the two.

As illustrated in FIG. 9, the radio network node 410, more specifically the association determiner 530, determines which antenna 415 among the plurality of antennas 415 is being used to communicate with the target wireless terminal 430 in step 910. In the scenario depicted in FIG. 4, the association determiner 530 determines that the first antenna 415-1 is being used.

In one aspect, the scheduler 550 schedules the communications between radio network node 410 and the one or more wireless terminals 430 in the cell 420 on a per antenna basis, on the uplink, the downlink, or both. One advantage of the per antenna scheduling is that one deeply fading terminal may consume the scheduling threshold, e.g., the RoT threshold, for one antenna, but will not consume the threshold for other antennas serving the cell 420. But perhaps more importantly (at least for the discussion at hand), another advantage is that the per antenna scheduling can be used to associate the antennas and the wireless terminals in the cell. That is, the association determiner 530 can determine the association between the first antenna 415-1 and the target wireless terminal 430 based on the per antenna communications scheduling.

In step 920, the network communicator 510 sends a signal information to the positioning node 440. The signal information includes characteristics or properties of the wireless signal used for the wireless communication between the first antenna 415-1 and the target wireless terminal 430. In one aspect, the signal information includes one or more position measurements. Each position measurement can be a path loss measurement, a signal strength measurement, a time-based range measurement, an angle-of-arrival (AoA) measurement, a fingerprint measurement, a time of transmission measurement, a time of arrival (TOA) measurement, or other measurements that enable terrestrial positioning methods to be performed.

The path loss measurement can be based on a received signal strength (RSS) measurement and transmit power. Note that in typical scenarios, the radio network node 410 such as the RBS or the eNodeB has knowledge of the transmission power used by the target wireless terminal 430. This combined with the measured RSS allows the radio network node 410 to compute the path loss between the radio network node 410 and the target wireless terminal 430. (The path loss can also be computed by the positioning node 410) The time-based range measurement can be a timing advance (TA) measurement or a round trip time (RTT) measurement. The TOA measurement can be an uplink time difference of arrival (U-TDOA).

Referring back to FIG. 9, the network communicator 510 also sends an association information to the positioning node 440 in step 930. As the name implies, the association information includes information that associates the first antenna 415-1 with the target wireless terminal 430. At a minimum, it is preferred that the association information includes information that identifies the antenna 415 being used to communicate with the target wireless terminal 430. For example, the identity of the first antenna 415-1 can be included in the association information sent to the positioning node 440.

The association information can also include configuration information corresponding to the antenna being used for communication, i.e., corresponding to the first antenna 415-1 in this instance. For ease of reference, the configuration information corresponding to the first antenna 415-1 will be referred to as the first configuration information. In this context, the configuration information generally refers to the characteristics of the antenna itself. Thus, the first configuration information includes characteristics of the first antenna 415-1, i.e., the first configuration information can be specific to the first antenna 415-1.

For example, the first configuration information can include the geographical location of the first antenna 415-1 also referred to as the first geographical location. For terrestrial positioning, this information would be necessary. The following is a non-exhaustive list of information that can be included in the first configuration information:

an azimuth angle;
an altitude,
an elevation angle,
a bore-sight direction,
a geographical region covered by the first antenna 415-1,
a delay parameter related to signaling between the first antenna 415-1 and the position measurer 540 which performs the position measurements; and
cabling power loss.

The delay parameter can be related to the delay caused by cabling between the first antenna 415-1 and the position measurer 540, a cabling distance between first antenna 415-1 and the position measurer 540, or a radio relaying delay between the antenna and the position measurer 540. These types of information allows for use of measurements via split antenna systems, to be used for calculation of accurate target wireless terminal 430 positions.

As illustrated in FIG. 10, the method 1000 performed by the positioning node 440 complements the method 900 performed by the radio network node 410. In the method 1000, the network communicator 610 receives in step 1010 the association information from the radio network node 410. In step 1020, the network communicator 610 receives the association information also from the radio network node 410. Based on the received signal information and the association information, the position determiner 620 determines the position of the target wireless terminal 430. The association information and the first configuration information are described in detail above with reference to FIG. 9.

As illustrated in FIGS. 9 and 10, the radio network node 410 sends the association information and the first configuration information to be received by the positioning node 440. In one aspect, this communication is performed over a positioning protocol 435 (see FIG. 4), which is a communication protocol defined for exchange of position related information between the radio network node 410 and the positioning node 440. In other words, the radio network node 410 performs steps 920 and 930 over the positioning protocol 435 and the positioning node 440 performs steps 1010 and 1020 over the positioning protocol. The positioning protocol may be a control plane protocol or a user plane protocol.

Of course, a network operator can implement a proprietary positioning protocol. However, in one aspect, it is preferred that existing communication protocols be used as the positioning protocol. Examples of such protocols include NBAP (Node-B Application Part), RNSAP (Radio Network Subsystem Application Part), PSAP (Public Safety Answering Point), LPP (LTE Positioning Protocol), LPPa (LTE Positioning Protocol A), RANAP (Radio Access Network Application Part), and SUPL (Secure User Plane Location).

In one aspect, the existing protocols can be extended to include new information elements to carry the association information (between the antenna and target wireless terminal) and configuration information (of the antenna). This can be useful when the radio network node 410 includes all configuration information—e.g., the geographical location, azimuth, altitude, elevation angle, etc.—necessary to calculate the position of the TWC 430 in the association information are provided to the positioning node 440. However, this can also increase the traffic between the radio network node 410 and the positioning node 440, and also make backward compatibility with legacy terminals difficult.

It is noted that once installed, the characteristics of the antenna are more or less static. For example, the antenna's location will be fixed for a long time frame. Similarly, the azimuth angle, the altitude, the elevation angle, the bore-sight direction and the geographical region covered by the will also likely remain unchanged for a long time. Even the cabling between the antenna and the position measurer 540 as well as the cabling power loss are likely to be fixed at least on a relatively long time scale.

Such configuration information can be maintained in a configuration database 630 (see FIG. 6) local to the positioning node 440 or through a server easily accessible to the positioning node 440. Then the radio network node 410 only needs to include the identity of the antenna in the in the association information (the signal information is still provided). The positioning node 440 then can retrieve configuration information of the antenna based on the antenna identity.

Thus, in one alternative aspect, any existing protocol can be extended to include a new information element to carry the antenna identity. This limits the amount of changes to the existing protocols, reduces the data traffic between the radio network node 410 and the positioning node 440, and significantly reduces the backward compatibility difficulties.

But in another alternative aspect, no new information element is created. Rather, some of the bits of the existing information elements of the positioning protocol are borrowed to encode the antenna identity. In this way, the format of the existing protocol is not changed—only the procedure of interpreting the information contained in the information element is changed. In this way, the backward compatibility issues are essentially eliminated.

Justification for the bit borrowing concept is explained as follows. Results of fields trials of RTT (round trip time) positioning algorithm in WCDMA indicate that that only 10% of the positionings have accuracies better than 8 m and only 5% have accuracies better than 4 m. (See—"*RTT positioning in WCDMA*", T. Wigren and J. Wennervirta, *Proceedings of the 5th International Conference on Wireless and Mobile Communications, ICWMC* 2009, *Cannes/La Bocca, France, pp.* 303-308, *Aug.* 23-29, 2009—herein incorporated by reference in its entirety.) Also consider the RTT measurement resolution. According to the 3GPP standard the resolution is $1/16^{th}$ of a chip. Since 1 chip single way corresponds to 78 m at 3.84 MHz, $1/16^{th}$ of a chip corresponds to 4 m. Since the RTT measurement is divided by 2 in the position calculation, the distance associated with the least significant bit of the RTT measurement is 2 m.

The conclusion is that in a majority of cases, simply ignoring the measurement value represented by two or even four least significant bits (LSB) will not significantly affect the overall RTT positioning accuracy. As an illustration, the two LSBs represent a range of 6 m. This means that for over 90% of the positionings, the measurement accuracy will not suffer by ignoring these two LSBs.

Thus, in the alternative aspect, one or more least significant bits of an already existing information element of the positioning protocol defined to carry a position measurement. It can thus be said that the association information—the antenna identity—is carried in the signal information.

FIG. 11 illustrates a flow chart of an example process performed by the radio network node 410 to implement this LSB bits borrowing concept to send the signal information and the association information (steps 910, 920) to the positioning node 440. In step 1110, the network communicator 510 of the radio network node 410 encodes the first antenna identity in one or more LSBs of a position measurement included in the signal information. Examples of position measurements are described above. Then in step 1120, the network communicator 510 sends the signal information with the encoded position measurement to the positioning node 440 over the positioning protocol.

FIG. 12 illustrates a flow chart of an example process performed by the positioning node 440 also to implement the LSB bits borrowing concept to receive the signal information and the association information (steps 1010, 1020) from the radio network node 410. In step 1210, the network communicator 610 of the positioning node 440 receives the signal information with the encoded position measurement from the positioning node 440 over the positioning protocol. Then in step 1220, the network communicator 610 decodes the one or more least significant bits of the position measurement included in the signal information to retrieve the first antenna identity.

As an illustration, assume that a cell is served by four antennas in different geographical locations. Then in one embodiment, two LSBs can be used for encoding as follows:

Antenna 0: RTT_LSB_0=0; RTT_LSB_1=0
Antenna 1: RTT_LSB_0=1; RTT_LSB_1=0
Antenna 2: RTT_LSB_0=0; RTT_LSB_1=1
Antenna 3: RTT_LSB_0=1; RTT_LSB_1=1

The modified and encoded RTT measurement is then transmitted, for example, over the NBAP protocol (possibly relayed over RNSAP) as a part of the DEDICATED MEASUREMENT INITIATION RESPONSE message, to the RNC. The RNC then decodes the information and interprets the two LSBs as follows:

If (RTT_LSB_0=0) & (RTT_LSB_1=0), Antenna number=0;
Elseif (RTT_LSB_0=1) & (RTT_LSB_1=0), Antenna number=1;
Elseif (RTT_LSB_0=0) & (RTT_LSB_1=1), Antenna number=2;
Elseif (RTT_LSB_0=1) & (RTT_LSB_1=1), Antenna number=3;
End.

The RNC may without significant loss of accuracy use the received encoded RTT measurement as is, or set RTT_LSB_0 and RTT_LSB_1 to a default value such as 00. In LTE, the LSB borrowing concept can be applied to TA and AoA measurements.

Any position measurements may be used to encode the antenna identity. The number of LSBs borrowed will depend on the number of antennas serving the cell. The primary driver is that when the field accuracy of these position measurements are worse than the resolution represented by the few LSBs, the LSBs can be borrowed without any significant loss of measurement accuracy.

Figure 13:
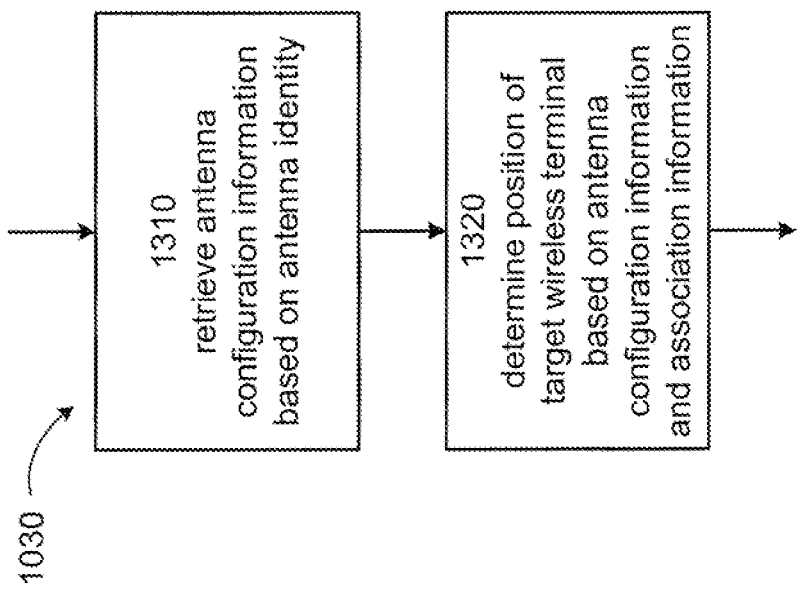
FIG. 13 illustrates a flow chart of an example process performed by a positioning node to determine a position of a target wireless terminal.

FIG. 13 illustrates a flow chart of an example process performed by the positioning node 440 to implement the step 1030 to determine the position of the target wireless terminal 430. In this figure, it is assumed that the first antenna identity is available. The first antenna identity may have been included in the association information in its own information element (no decoding needed) or may have been decoded from an information element of a position measurement through the process as illustrated in FIG. 12.

Referring back to FIG. 13, the position determiner 620 in step 1310 retrieves the first configuration information which is the antenna configuration information corresponding to the first antenna 415-1 based on the first antenna identity. In one aspect, the configuration information of the plurality antennas is maintained in a configuration database 630 (possibly stored in the storage 830 or in a server). The types of information that can be included in the configuration information of antennas are described above. In this instance, the position determiner 620 retrieves the first configuration information from the database using the first antenna identity as an index to the database.

In step 1320, the position determiner determines the position of the target wireless terminal based on the first configuration information and the association information. Recall that the signal information includes position measurements. The position determiner 620 determines the position of the target wireless terminal 430 based on one or more position measurements factoring in the configuration information.

Examples of some inventive terrestrial position determination techniques are described below. In the examples to follow, when it is indicated that the configuration information is retrieved, the manner in which the configuration information is retrieved should not be taken to be limiting unless specifically indicated. For example, the configuration information may be retrieved from the configuration database per process illustrated in FIG. 13. In another example, the configuration information may be included in the association information provided from the radio network node 410. In yet another example, some may be retrieved from the configuration database and others may be included in the association information.

Split Cell ID Positioning (LTE and WCDMA)

The position determiner 620 retrieves the first configuration information describing the geographical region of the cell covered by the first antenna 415-1. This provides a refined Cell ID positioning result. Since it is in a 3GPP format, the position result can be reported as is. This positioning technique can cover subway positioning with a 180 degree dual antenna configuration.

Split Path Loss and RSS Positioning (LTE and WCDMA)

Path loss and RSS is measured with respect to the locations where the travel of the radio waves occurs over the air. This means that the locations of the antennas are important for positioning purposes. The distance between this point and the target wireless terminal 430 can then be determined by using standard path loss models.

For cells served by geographically dispersed antennas, in an example of the inventive split path loss and RSS positioning technique, the positioning node 440 retrieves the location of the first antenna 415-1 and the cell associated with the target wireless terminal 430 and calculates the position based on the retrieved information. The altitude, elevation, azimuth of the first antenna 415-5 can also be retrieved and used in a more sophisticated position calculation technique. Further, cable loss information can be used to compensate for the measured RSS and or path loss.

If triangulation is to be performed, the described technique can be repeated for a number of non-colocated antennas, possibly being parts of different cells or even different base stations altogether.

Split TA and RTT Positioning (LTE and WCDMA)

For TA and RTT positioning, one such positioning measurement may be sufficient. In such instances, the target wireless terminal 430 is to be located in a circular strip circumventing the transmitting and/or receiving antenna of the cell associated with the target wireless terminal 430. See FIG. 4 as an example.

Hence, in an example of the inventive split TA and RTF positioning technique, the positioning node 440 retrieves the location of the first antenna 415-1 uses this for the position calculation. Other configuration information such as the altitude may also be retrieved and used in a more sophisticated solution.

An issue that should be taken into account is associated with a delay in the travel time of signals—along a cable or via a radio relay—from the antenna to the position measurer 540 (of the radio network node 410) where position measurement such as RTT takes place. To address this issue, the position determiner 620 (of the positioning node 440) can retrieve this delay directly from the configuration database (which assumes that the delay time value is stored) or can compute the delay using the distance between the antenna and the position measurer 540 and the speed of signal travel (e.g., speed of light). The delay can then be subtracted from the measured RTT or TA. The position determiner 620 uses the compensated RTT or TA in the position calculation.

Split AoA Positioning (LTE)

In AoA positioning, the position of the target wireless terminal 430 is determined as being in an angular sector with a center point angle given by the antenna bore-sight direction with respect to a default direction, typically north. The center point of the angular sector is assumed to be the antenna position.

In an example of the inventive Split AoA positioning technique, the position determiner 620 retrieves the location of the first antenna 415-1 and the antenna direction from the configuration database 630. This information is then used in the position calculation. Normally AoA information would be combined with the geographical extension of the cell, and/or with TA. All of these can be obtained for a split antenna solution.

In a more sophisticated solution, the position determiner 620 may also retrieve and use the altitude and elevation angles of the first antenna 415-1 to provide a vertical dimension to the AoA positioning as well.

Split Fingerprinting Positioning (LTE and WCDMA)

The use of fingerprinting positioning, in particular AECID, can be used in split antenna mode, by using quantities compensated as described above. The fingerprint should include the antenna identities. The details should be straight forward to those skilled in the art familiar with AECID.

Split U-TDOA Positioning (LTE and WCDMA)

U-TDOA positioning measures (i) the time of arrival in multiple base stations of certain transmissions, and (ii) uses trilateration to compute an intersection where the target wireless terminal 430 is located. Therefore, in an example of the inventive Split U-TDOA positioning technique, the position determiner 620 retrieves or computes the delay associated with the signal travel time from the first antenna 415-1 to the position measurer 540, using the distance and the speed of signal travel. This is then followed by a subtraction of the delay from the measured TOA. The compensated TOA is then used in the position calculation.

In trilateration, the positions of the multiple antennas involved in the U-TDOA positioning are necessary. Thus, in the example inventive Split U-TDOA positioning technique, the position determiner 620 retrieves the locations of all involved antennas (locations of all first antennas) to perform the trilateration. Other configuration information such as altitudes may be used in a more sophisticated solution.

Split OTDOA Positioning (LTE)

The OTDOA positioning in LTE is a downlink time difference of arrival positioning method. It relies on the transmission times as counted from the antennas involved to compute the travel time of radio waves between the transmit antennas of the radio network node 410 and the target wireless terminal 430. The locations of the transmit antennas are needed as well.

In an example of the split OTDOA technique, the position determiner 620 retrieves or computes the delay associated with the signal travel time from the transmitter of the radio network node 410 to the first antenna 415-1 transmitting the radio waves, using the distance and the speed of signal travel. This is followed by a subtraction of the result from the measured time of transmit. The obtained compensated time of transmit is then used in the position calculation.

Again, positions of all involved antennas are necessary to determine the position of the target wireless terminal 430. Thus, in the example inventive Split OTDOA positioning technique, the position determiner 620 retrieves the locations of all involved antennas of the cells associated with the downlink transmission. Other configuration information such as altitudes may be used in a more sophisticated solution.

There many advantages associated with one or more aspects of the disclosed subject matter. A non-exhaustive list of advantages include:

- Significantly enhanced accuracy in situations where antennas are split and located in distinct geographical locations, even though each antenna belongs to the same cell (e.g., coverage for coverage holes in a cell);
- Significantly enhanced accuracy in situations where antennas are split and located in a same geographical location but in different vertical locations, even though each antenna belongs to the same cell (e.g., distinct floors in the same building);
- Significantly enhanced accuracy in situations where antennas are split and located in the same geographical location but with different elevation (vertical) angles, even though each antenna belongs to the same cell (e.g., coverage in a mountainous terrain; and
- Significantly enhanced accuracy in situations where antennas are split and located in the same geographical location but with different azimuth (horizontal) angles, even though each antenna belongs to the same cell (e.g., coverage at subway stations).

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed in a radio network node of a wireless network for determining a position of a target wireless terminal in a cell, the method comprising:

determining that a first antenna of the cell is being used to wirelessly communicate with the target wireless terminal;

sending a signal information to a positioning node, the signal information comprising one or more properties of a wireless signal used for the wireless communication between the first antenna and the target wireless terminal; and sending an association information to the positioning node, the association information comprising information associating the first antenna with the target wireless terminal, wherein the radio network node provides wireless communication services in the cell through a plurality of antennas, wherein the plurality of antennas include the first antenna and a second antenna whose radio coverages are decoupled from each other, wherein the target wireless terminal is one of one or more wireless terminals in the cell being provided with the wireless communication services through the plurality of antennas, wherein the radio network node comprises a scheduler that schedules communications between the radio network node and the one or more wireless terminals on a per antenna basis, and wherein the step of determining that the first antenna of the cell is being used to wirelessly communicate with the target wireless terminal comprises determining the association between the first antenna and the target wireless terminal based on the per antenna communications scheduling.

2. The method of claim 1, wherein the decoupling of the radio coverages between the first and second antennas is due to any one or more of:
geographical locations of the first and second antennas being different,
vertical locations of the first and second antennas being different,
elevation angles of the first and second antennas being different, and
azimuth angles of the first and second antennas being different.

3. The method of claim 1,
wherein the signal information comprises one or more position measurements, and
wherein each position measurement is one of a path loss measurement, a signal strength measurement, a time-based range measurement, an angle-of-arrival (AoA) measurement, a fingerprint measurement, a time of transmission measurement and a time of arrival (TOA) measurement.

4. The method of claim 3, wherein the association information comprises an identity of the first antenna.

5. The method of claim 4,
wherein the association information further comprises a first configuration information corresponding to the first antenna, and
wherein the first configuration information comprises a geographical location information of the first antenna.

6. The method of claim 5, wherein the first configuration information further comprises one or more of an azimuth angle of the first antenna, an altitude of the first antenna, an elevation angle of the first antenna, a bore-sight direction of the first antenna, a geographical region covered by the first antenna, a delay parameter related to signaling between the first antenna and a position measurer of the radio network node that performs position measurements, and cabling power loss.

7. The method of claim 4, wherein the step of sending the signal information and the step of sending the association information to the positioning node comprise:
encoding the identity of the first antenna in one or more least significant bits of a position measurement included in the signal information; and
sending the signal information with the encoded position measurement to the positioning node over a positioning protocol,
wherein the positioning protocol is a protocol defined for exchange of position related information between the radio network node and the positioning node.

8. A method performed in a positioning node for determining a position of a target wireless terminal in a cell of a wireless network, the method comprising:
receiving a signal information from a radio network node of the wireless network, the signal information comprising one or more properties of a wireless signal used for communication between a first antenna and the target wireless terminal, wherein the signal information comprises one or more position measurements and further wherein each position measurement is one of a path loss measurement, a signal strength measurement, a time-based range measurement, an angle-of-arrival (AoA) measurement, a fingerprint measurement, a time of transmission measurement and a time of arrival (TOA) measurement;
receiving an association information from the radio network node, the association information comprising information associating the first antenna with the target wireless terminal, wherein the association information comprises an identity of the first antenna; and
determining the position of the target wireless terminal based on the signal information and the association information,
wherein the radio network node provides wireless communication services in the cell through a plurality of antennas,
wherein the plurality of antennas include the first antenna and a second antenna whose radio coverages are decoupled from each other,
wherein the step of receiving the signal information and the step of receiving association information from the radio network node comprise:
receiving the signal information the radio network node over a positioning protocol; and
decoding one or more least significant bits of a position measurement included in the signal information to retrieve the identity of the first antenna,
wherein the positioning protocol is a protocol defined for exchange of position related information between the radio network node and the positioning node,
wherein the step of determining the position of the target wireless terminal comprises:
retrieving a first configuration information from a database using the identity of the first antenna as an index to the database; and
determining the position of the target wireless terminal based on the first configuration information and the association information,
wherein the first configuration information comprises a geographical location information of the first antenna.

9. The method of claim 8, wherein the decoupling of the radio coverages between the first and second antennas is due to any one or more of:
geographical locations of the first and second antennas being different,
vertical locations of the first and second antennas being different,
elevation angles of the first and second antennas being different, and
azimuth angles of the first and second antennas being different.

10. The method of claim 8,
wherein the association information further comprises the first configuration information corresponding to the first antenna, and
wherein the first configuration information comprises a geographical location information of the first antenna.

11. The method of claim 10, wherein the first configuration information further comprises one or more of an azimuth angle of the first antenna, an altitude of the first antenna, an elevation angle of the first antenna, a bore-sight direction of the first antenna, a geographical region covered by the first antenna, a delay parameter related to signaling between the first antenna and a position measurer of the radio network node that performs position measurements, and cabling power loss.

12. The method of claim 8, wherein the first configuration information further comprises any one or more of an azimuth angle of the first antenna, an altitude of the first antenna, an elevation angle of the first antenna, a bore-sight direction of the first antenna, a geographical region covered by the first antenna, a delay parameter related to signaling between the first antenna and a position measurer of the radio network node that performs position measurements, and cabling power loss.

13. A radio network node of a wireless network, the radio network node being structured to determine a position of a target wireless terminal in a cell, the radio network node comprising:
  a plurality of antennas structured to provide wireless communication services in the cell, the plurality of antennas including a first antenna and a second antenna whose radio coverages are decoupled from each other;
  an association determiner structured to determine that the first antenna is being used to wirelessly communicate with the target wireless terminal; and
  a network communicator structured to
    send a signal information to a positioning node, the signal information comprising one or more properties of a wireless signal used for the wireless communication between the first antenna and the target wireless terminal, and
    send an association information to the positioning node, the association information comprising information associating the first antenna with the target wireless terminal,
  wherein the target wireless terminal is one of one or more wireless terminals in the cell being provided with the wireless communication services through the plurality of antennas,
  wherein the radio network node further comprises a scheduler structured to schedule communications between the radio network node and the one or more wireless terminals on a per antenna basis, and
  wherein the association determiner structured to determine the association between the first antenna and the target wireless terminal based on the per antenna communications scheduling.

14. The radio network node of claim 13, wherein the decoupling of the radio coverages between the first and second antennas is due to any one or more of:
  geographical locations of the first and second antennas being different,
  vertical locations of the first and second antennas being different,
  elevation angles of the first and second antennas being different, and
  azimuth angles of the first and second antennas being different.

15. The radio network node of claim 13, further comprising:
  a position measurer structured to provide one or more position measurements, each position measurement being one of a path loss measurement, a signal strength measurement, a time-based range measurement, an angle-of-arrival (AoA) measurement, a fingerprint measurement, a time of transmission measurement and a time of arrival (TOA) measurement, and
  wherein the signal information comprises the one or more position measurements.

16. The radio network node of claim 15,
  wherein the association information comprises an identity of the first antenna,
  wherein the network communicator is structured to
  encode an identity of the first antenna in one or more least signify cant bits of a position measurement included in the signal information, and
  send the signal information with the encoded position measurement to the positioning node over a positioning protocol, and
  wherein the positioning protocol is a protocol defined for exchange of position related information between the radio network node and the positioning node.

17. A positioning node structured to determine a position of a target wireless terminal in a cell of a wireless network, the positioning node comprising:
  a network communicator structured to
  receive a signal information from a radio network node of the wireless network, the signal information comprising one or more properties of a wireless signal used for communication between a first antenna and the target wireless terminal, wherein the signal information comprises one or more position measurements and further wherein each position measurement is one of a path loss measurement, a signal strength measurement, a time-based range measurement, an angle-of-arrival (AoA) measurement, a fingerprint measurement, a time of transmission measurement and a time of arrival (TOA) measurement, and
  receive an association information from the radio network node, the association information comprising information associating the first antenna with the target wireless terminal; and
  a position determiner structured to determine the position of the target wireless terminal based on the signal information and the association information,
  wherein the radio network node provides wireless communication services in the cell through a plurality of antennas,
  wherein the plurality of antennas include the first antenna and a second antenna whose radio coverages are decoupled from each other,
  wherein the association information comprises an identity of the first antenna,
  wherein the network communicator is structured to
    receive the signal information from the radio network node over a positioning protocol, and
    decode one or more least significant bits of a position measurement included in the signal information to retrieve the identity of the first antenna,
  wherein the positioning protocol is a protocol defined for exchange of position related information between the radio network node and the positioning node,
  wherein the position determiner is structured to retrieve a first configuration information from a database using the identity of the first antenna as an index to the database, and determine the position of the target wireless terminal based on the first configuration information and the association information, wherein the first configuration information comprises a geographical location information of the first antenna, and wherein the first configuration information further comprises any one or more of an azimuth angle of the first antenna, an altitude of the first antenna, an elevation angle of the first antenna, a bore-sight direction of the first antenna, a geographical region covered by the first antenna, a delay parameter related to signaling between the first antenna and a position measurer of the radio network node that performs position measurements, and cabling power loss.

18. The positioning node of claim 17, wherein the decoupling of the radio coverages between the first and second antennas is due to any one or more of:

geographical locations of the first and second antennas being different, vertical locations of the first and second antennas being different, elevation angles of the first and second antennas being different, and azimuth angles of the first and second antennas being different.

\* \* \* \* \*